United States Patent [19]

Pluijms et al.

[11] Patent Number: 4,793,843
[45] Date of Patent: Dec. 27, 1988

[54] METHOD OF MANUFACTURING AN OPTICAL FIBER PREFORM

[75] Inventors: René A. M. Pluijms; Pieter van der Ree; Gerrit J. Koel; Jan G. J. Peelen, all of Eindhoven, Netherlands

[73] Assignee: U.S. Philips Corporation, New York, N.Y.

[21] Appl. No.: 29,351

[22] Filed: Mar. 20, 1987

Related U.S. Application Data

[63] Continuation of Ser. No. 758,586, Jul. 25, 1985, abandoned, which is a continuation of Ser. No. 580,976, Feb. 16, 1984, abandoned.

[30] Foreign Application Priority Data

Feb. 22, 1983 [NL] Netherlands .......................... 8300650

[51] Int. Cl.$^4$ ....................... C03C 25/02; C03C 17/00
[52] U.S. Cl. ......................................... 65/3.12; 65/31; 65/DIG. 16
[58] Field of Search ................ 65/3.11, 3.12, 31, 3.15, 65/DIG. 16; 427/38, 39, 163

[56] References Cited

U.S. PATENT DOCUMENTS

| | | | |
|---|---|---|---|
| 4,356,246 | 10/1982 | Tabei et al. | 427/39 |
| 4,425,146 | 1/1984 | Izawa et al. | 65/3.12 X |
| 4,453,961 | 6/1984 | Berkey | 65/18.2 |
| 4,468,413 | 8/1984 | Bachman | 427/163 |
| 4,481,229 | 11/1984 | Suzuki et al. | 427/38 |
| 4,493,721 | 1/1985 | Auwerda et al. | 65/3.12 |

FOREIGN PATENT DOCUMENTS

| | | | |
|---|---|---|---|
| 91173 | 10/1983 | European Pat. Off. | 65/31 |
| 2504514 | 10/1982 | France | 65/3.12 |
| 54-30852 | 3/1979 | Japan | 65/3.12 |
| 55-10468 | 1/1980 | Japan | 65/3.12 |
| 2067182 | 7/1981 | United Kingdom | 65/3.12 |

*Primary Examiner*—David L. Lacey
*Assistant Examiner*—Michael K. Boyer
*Attorney, Agent, or Firm*—Ernestine C. Bartlett

[57] ABSTRACT

While collapsing the central duct in hollow glass optical fiber preforms, an etchant consisting of a mixture of oxygen and a fluorocarbon compound from the group $C_2F_6$, $C_3F_8$ and $N-C_4F_{10}$ is passed through the duct. In particular, the etchant is passed through the duct only when the duct's diameter is 1 mm or smaller. The resulting solid preforms and optical fibers drawn therefrom do not have a central dip in the refractive index profile.

11 Claims, 2 Drawing Sheets

METHOD OF MANUFACTURING AN OPTICAL FIBER PREFORM

This is a continuation of application Ser. No. 758,586, filed July 25, 1985, now abandoned which is a continuation of Ser. No. 580,976, filed Feb. 16, 1984 now abandoned.

BACKGROUND OF THE INVENTION

The invention relates to a method of manufacturing a solid perform for drawing optical fibers. The method starts with a hollow preform having a central duct extending in the longitudinal direction of the hollow preform. At least the part of the hollow preform bounding the duct consists of quartz glass doped with a dopant which is more volatile than silica. In the method, the hollow preform is heated, while passing a fluorine-containing gaseous etchant through the duct, to a temperature at which the duct starts closing spontaneously so as to form a solid preform of the same length as the hollow preferom. In its specific embodiment, the invention is a method of manufacturing a solid optical preform, the method consisting essentially of the steps of providing a hollow optical fiber preform having a longitudinal direction, said hollow preform having an inside wall bounding a central duct, the central duct extending in the longitudinal direction, the inside wall portion of the hollow preform comprising quartz glass doped with a dopant, said dopant being more volatile than quartz glass; heating the hollow preform to a temperature at which the duct closes spontaneously to form a solid preform; and pasing a gaseous etchant through the central duct while the duct is closing and without the formation of a plasma in the duct, said gaseous etchant consisting of oxygen and $C_2F_6$.

Hollow preforms which have a central duct extending in the longitudinal direction occur as intermediate products in various proceses for manufacturing optical fibers. For example, such hollow preforms may be produced in a process in which vitreous particles are deposited on a mandril, until the desired quantity of material has been deposited, after which the mandril is removed. In other processes (e.g. MCVD and PCVD) quartz glass tubes are coated internally with vitreous material to produce hollow preforms.

Nowadays it is common practice to close the longitudinal duct in a separate manufacturing step before starting to draw the fiber. This presents important advantages over processes in which fibers are drawn directly from hollow preforms. Solid preforms can be stored, for example, for longer periods of time without contaminating the inner layers which will be come the light-propagating cores of the fibers.

When closing the central duct, the procedure is, for example, as follows. The preform is heated by a burner which is reciprocated at a uniform speed along the length of the rotating preform. Under the influence of the surface tension of the softened preform material, the diameter of the duct gradually decreases until the duct closes entirely on passing the burner for the last time. This method is used in particular in closing hollow preforms obtained by means of an MCVD or PCVD process.

In this case of porous preforms which are constructed from vitreous particles, the duct closes during the consolidation or vitrification of the particles.

A generally used dopant in the manufacture of optical fibers from quartz glass is germanium dioxide ($GeO_2$). When collapsing preforms containing quartz glass doped with a comparatively volatile dopant, for example germanium dioxide, a part of the dopant may evaporate from layers adjacent the central duct. This results in a disturbance in the refractive index profile. In this case, the diffusion of the dopant from parts of the preform situated further away from the central duct also plays a part. The profile disturbance has an adverse influence on the bandwidth of the optical fiber.

It has already been suggested to reduce the profile disturbance by flowing a fluorine-containing gaseous etchant through the central duct when collapsing the hollow preform. The gaseous etchant reacts with the layer which has been depleted of dopant by evaporation, while forming gaseous etching products. (See, for example, GB No. 2,084,988 A and FR No. 2,504,514). Gaseous etchants mentioned are mixtures of oxygen and dichlorodifluoromethane ($CCl_2F_2$), sulphur hexafluoride ($SF_6$), carbon tetrafluoride ($CF_4$), trichloromonofluoromethane ($CCL_3F$) and monochlorotrifluoromethane ($CCLF_3$).

It has been found in practice that the known etchant compounds do not give satisfactory results. It has been found tht the disturbance of the refractive index profile can be reduced, but it cannot be avoided. (See, French patent application No. 2,504,514).

SUMMARY OF THE INVENTION

It is an object of the invention to collapse a hollow preform into a solid optical fiber preform without disturbing the refractive index profile of the preform. It has been found that this object can be achieved by a method in which the fluorine-containing etchant consists of a mixture of oxygen and one or more gaseous fluorocarbon compounds, selected from the group consisting of hexafluoroethane ($C_2F_6$), octafluoropropane ($C_3F_8$) and decafluoro-n-butane ($n-C_4F_{10}$). By using these compounds, the available fluorine concentration per standard unit of volume is substantially larger than with the known etchant compounds, including $SF_6$. Although $SF_6$ per standard unit of volume comprises an equal amount of fluorine as, for example, $C_2F_6$, it has been found in practice that at the collapsing temperatures used the quantity of $SiO_2$ etched-away does not correspond to the theoretically calculated quantity based on the quantity of available $SF_6$. The incomplete reaction impedes control of the etching process, and the reproducibility is bad. This is not the case with, for example, $C_2F_6$. The fluorine content of $C_2F_6$ is used completely. The compounds $C_3F_8$ and $C_4F_{10}$ have a still higher fluorine quantity in standard conditions.

When the fluorine etchant compounds according to the invention are used, the fluorine is presented in a more concentrated form so that a smaller supply (volume of gas which is supplied per unit time) will produce sufficient etching than is the case with compounds which comprise less fluorine per molecule. The etching process may now be carried out in the last stage of hte collapsing process. The inner surface of the duct is then so much smaller that the evaporation of dopant only plays a minor role. The quantity of evaporating dopant is proportional to the surface area of the duct.

It has consequently been found that it is possible to completely remove the so-called dip in the refractive index profile of gradient index fibers when etching with hexafluoroethane. The gaseous etchant preferably comprises 5–30 vol. % $C_2F_6$, the remainder being oxygen. The etchant pressure may at most be equal to the pressure of the ambient atmosphere. The gas supply during the collapsing process may be 50 to 60 standard cubic centimeters per minute (sccm).

Preferably, oxygen is passed through the central duct in the first stage of the collapsing process until the diameter of the duct has decreased to at most 1 mm. The fluorine-containing etchant is then passed through the duct and the duct is closed.

When etchants are used in which the fluorine is present in a concentrated form, small quantities of etchant will suffice. The actual etching takes place in the very last stage of closing the duct. Since the inner surface is then small, the quantity of dopant evaporated from the doped layer exposed during etching is proportionally small.

DESCRIPTION OF THE PREFERRED EMBODIMENTS

The experiments described below were carried out with a "Heralux" quartz glass tube having an outside diameter of 21 mm and an inside diameter of 17 mm. The glass tube was coated internally with a layer having a thickness of 450 μm. The layer was built up from 900 sub-layers, each having a thickness of 0.5 μm. The layer had a varying refractive index and consisted of quartz glass doped with an increasing quantity of germanium dioxide. The layer was provided by means of a nonisothermal plasma deposition process such as that described in U.S. Patent Re. 30,635. The hollow tube was collapsed by reciprocating a burner past the rotating tube.

Figure 1:
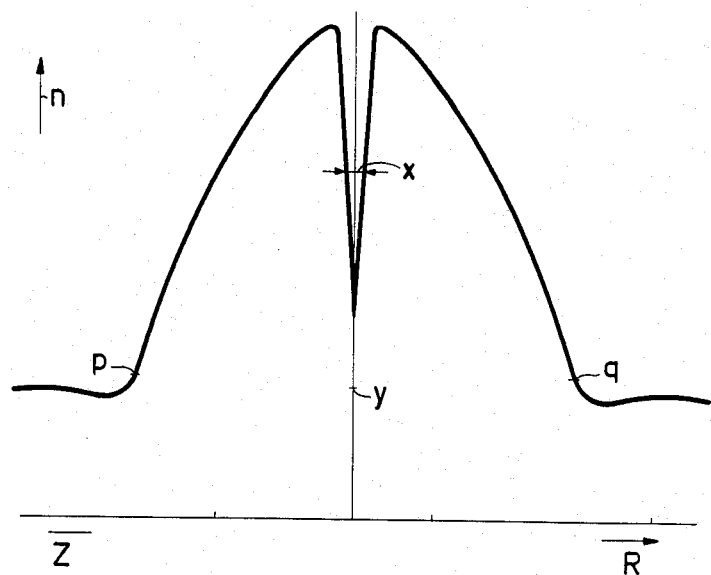
FIG. 1 is a graph showing the radial refractive index profile of an optical fiber drawn from a nonetched preform.
Figure 2:
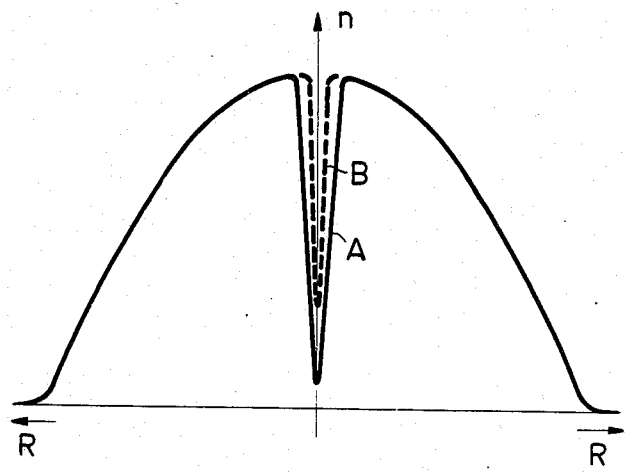
FIG. 2 is a graph showing the radial refractive index profile of an optical fiber drawn from a preform etched with $CF_4$ according to French Patent Application No. 2,504,514.

FIG. 1 shows the refractive index profile of an optical fiber obtained by drawing a preform into a fiber having a diameter of 125 μm. The width of the dip at the level x is 4.8% of distance p−q. The depth of the dip is 78.5% of the distance from the peak of the curve to the point y. FIG. 2 shows the influence of etching a preform with $CF_4$, as described in French patent application No. 2,504,514, on the refractive index profile. The depth of the dip after etching is still half the depth of the dip if no etching is carried out (curve A without etching, curve B with etching).

Figure 3:
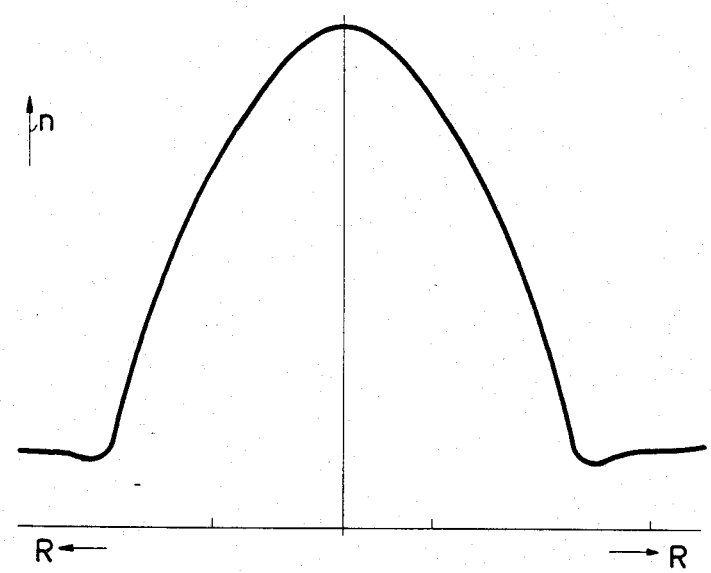
FIG. 3 is a graph showing the radial refractive index profile of an optical fiber drawn from a preform etched with $C_2F_6$ according to the invention.

FIG. 3 shows the refractive index profile of an optical fiber obtained by drawing a preform etched according to the invention. For that purpose, oxygen was first led through the central duct while the burner was moved past the tube. The supply of oxygen gas was reduced proportionally with the decrease of the diameter of the central duct. At the instant the inside diameter was approximately 1 mm, $C_2F_6$ was added to the oxygen. The gas mixture now had the composition 48 sccm $O_2$ + 10 sccm $C_2F_6$. It appears from FIG. 3 that there is no dip in the refractive index profile of the finished fiber.

Figure 4:
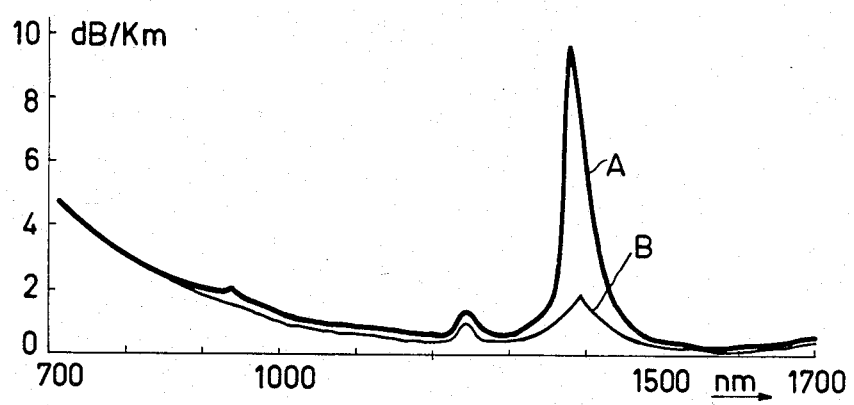
FIG. 4 is a graph showing attenuation as a function of wavelength for optical fibers which are drawn from a nonetched preform (curve A) and from a preform etched with $C_2F_6$ (curve B).

FIG. 4 shows two curves which indicate the dependence of the attenuation of the transported light signal on the wavelength thereof. Curve A relates to a fiber obtained from a nonetched preform. Curve B relates to a fiber obtained according to the invention. It has been found that the so-called water peak at 1380 nm is significantly reduced by etching with $C_2F_6$.

Figure 5:
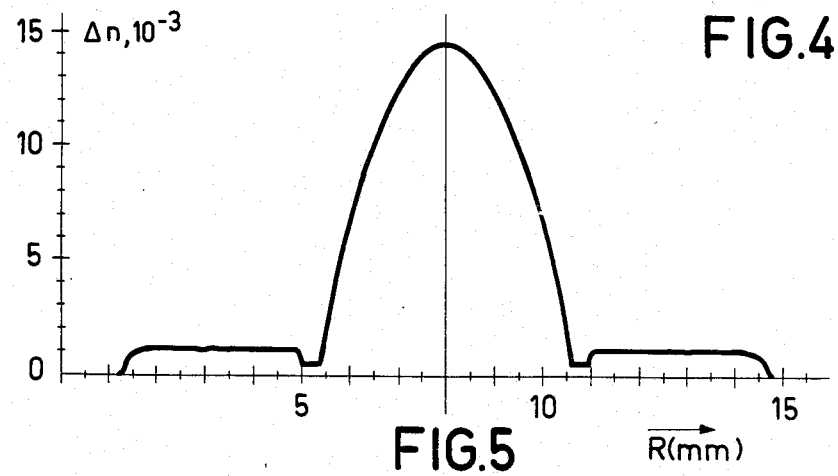
FIG. 5 is a graph showing the radial refractive index profile of an etched preform, as determined by a so-called preform analyser.

FIG. 5 shows the refractive index profile in a preform. From this it appears that due to the etching with $C_2F_6$ the so-called dip in a preform is eliminated.

What is claimed is

1. A method of manufacturing a solid optical fiber preform in which disturbance of the refractive index profile is substantially avoided, said method consisting essentially of the steps of:
   providing a hollow optical fiber preform having a longitudinal direction, said hollow preform having an inside wall bounding a central duct, the central duct extending in the longitudinal direction, the inside wall portion of the hollow preform comprising quartz glass doped with a dopant, said dopant being more volatile than quartz glass;
   heating the hollow preform to a temperature at which the duct closes spontaneously to form a solid preform; and
   passing a gaseous etchant through the central duct while the duct is closing, said gaseous etchant consisting of oxygen and 5–30 volume percent $C_2F_6$.

2. A method as claimed in claim 1, wherein:
   the step of passing the etchant through the duct is started when the duct has closed to a diameter approximately equal to one millimeter; and
   the method further comprises the step of passing oxygen through the duct while the duct is closing and until the diameter of the duct is approximately equal to one millimeter.

3. A method as claimed in claim 1, wherein the oxygen content of the gaseous etchant is 70–90% by volume.

4. A method as claimed in claim 1, wherein the pressure of the gaseous etchant in the central duct when the duct is closing is approximately equal to atmospheric pressure.

5. A method as claimed in claim 1, wherein the gaseous etchant is passed through the closing duct at a rate of 50 to 60 sccm.

6. A method of manufacturing a solid optical fiber preform in which disturbance of the refractive index profile is substantially avoided, said method consisting essentially of the steps of:
   providing a hollow optical fiber preform having a longitudinal direction, said hollow preform having an inside wall bounding a central duct, the central duct extending in the longitudinal direction, the inside wall portion of the hollow preform comprising quartz glass doped with a dopant, said dopant being more volatile than quartz glass;
   heating the hollow preform to a temperature at which the duct closes spontaneously to form a solid preform; and passing a gaseous etchant through the central duct after the duct has closed to a diameter approximately equal to one millimeter and while the duct is closing, said gaseous etchant consisting of oxygen and 5–30 volume percent and $C_2F_6$.

7. A method as claimed in claim 6, wherein the oxygen content of the gaseous etchant is 70–90% by volume.

8. A method as claimed in claim 6, wherein the pressure of the gaseous etchant in the central duct when the duct is closing is approximately equal to atmospheric pressure.

9. A method as claimed in claim 6, wherein the gaseous etchant is passed through the closing duct at a rate of 50 to 60 sccm.

10. A method of manufacturing a solid optical fiber preform in which disturbance of the refractive index profile is substantially avoided, said method comprising the steps of:

providing a hollow opitcal fiber preform having a longitudinal direction, said hollow preform having an inside wall bounding a central duct, the central duct extending in the longitudinal direction, the inside wall portion of the hollow preform comprising quartz glass dopoed with a dopant, said dopant being more volatile than quartz glass;

heating the hollow preform to a temperature at which the duct closes spontaneously to form a solid preform; and passing a gaseous etchant through the central duct while the duct is closing, said gaseous etchant consisting of 48 sccm oxygen and 10 sccm $C_2F_6$.

11. A method of manufacturing a solid optical fiber preform in which disturbance of the refractive index profile is substantially avoided, said method comprising the steps of:

providing a hollow optical fiber preform having a longitudinal direction, said hollow preform having an inside wall bounding a central duct, the central duct extending in the longitudinal direction, the inside wall portion of the hollow preform comprising quartz glass doped with a dopant, said dopant being more volatile than quartz glass;

heating the hollow preform to a temperature at which the duct closes spontaneously to form a solid preform; and passing oxygen through the central duct while said duct is closing and thereafter passing a gaseous etchant through the central duct after the duct has closed to a diameter approximately equal to one millimeter and while the duct is closing, said gaseous etchant consisting of 48 sccm oxygen and 10 sccm $C_2F_6$.

* * * * *